US006491584B2

(12) United States Patent
Graham et al.

(10) Patent No.: US 6,491,584 B2
(45) Date of Patent: Dec. 10, 2002

(54) GAMING MACHINE WITH RE-TRIGGER BONUS

(75) Inventors: Philippa Graham, Sydney (AU); Christopher Stevens, Sydney (AU)

(73) Assignee: Aristocrat Technologies Australia, New South Wales (AU)

( * ) Notice: Subject to any disclaimer, the term of this patent is extended or adjusted under 35 U.S.C. 154(b) by 0 days.

(21) Appl. No.: 09/821,588

(22) Filed: Mar. 29, 2001

(65) Prior Publication Data

US 2002/0025848 A1 Feb. 28, 2002

(30) Foreign Application Priority Data

Mar. 29, 2000 (AU) .............................................. PQ6564

(51) Int. Cl.[7] ................................................ A63F 13/00
(52) U.S. Cl. ............................................ 463/25; 463/21
(58) Field of Search .............................. 463/16–22, 25, 463/26

(56) References Cited

U.S. PATENT DOCUMENTS 6,059,289 A * 5/2000 Vancura .................. 273/143 R
6,059,658 A * 5/2000 Mangano et al. ............. 463/16
6,126,542 A * 10/2000 Fier ......................... 273/138.2
6,203,429 B1 * 3/2001 Demar et al. ........... 273/143 R

* cited by examiner

*Primary Examiner*—Arnold Castro
(74) *Attorney, Agent, or Firm*—Katten Muchin Zavis Rosenman

(57) ABSTRACT

A gaming machine has a display and a game controller arranged to control images displayed on the display. The game controller is arranged to play a game wherein random events are caused to be displayed on the display and, if a predefined winning event results, the machine awards a prize. If the predefined result includes a trigger condition which results in an initial series of free games awarded to a player and, during the initial series of free games, another trigger condition arises, a subsequent series of free games, including a bonus feature, is awarded and implemented immediately during the existence of the initial series of free games. The bonus feature applicable to the subsequent series of free games is applied to the remaining games of the initial series of free games as well as to the games of the subsequent series of free games.

10 Claims, 3 Drawing Sheets

GAMING MACHINE WITH RE-TRIGGER BONUS

FIELD OF THE INVENTION

This invention relates to a gaming machine. More particularly, the invention relates to a gaming machine and to an improvement to a game played on such a gaming machine.

BACKGROUND OF THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players. Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein random events are caused to be displayed on the display means and, if a predefined winning event results, the machine awards a prize, the gaming machine being characterised in that if the predefined result includes a trigger condition which results in an initial series of free games awarded to a player and, during the initial series of free games, another trigger condition arises, a subsequent series of free games, including a bonus feature, is awarded and implemented immediately during the existence of the initial series of free games with the bonus feature applicable to said subsequent series of free games being applied to the remaining games of the initial series of free games as well as to the games of the subsequent series of free games.

In a preferred embodiment of the invention, the game includes an initial bonus feature awarded during the initial series of free games. Then, when the subsequent series of free games occurs, the bonus feature of the subsequent series of free games supersedes the initial bonus feature applicable in respect of the remainder of the games of the initial series so that the bonus feature applicable to the subsequent series of free games applies to all the remaining free games.

It will be appreciated that, in the subsequent series of free games, if the trigger condition again arises to trigger a further series of free games, the further series of free games has a further bonus feature associated with it. The further bonus feature may supersede the bonus feature of the remaining games of the subsequent series of free games as well as any remaining games of the initial series of free games.

The awarding of yet further bonus features when additional free games are triggered may occur, optionally, a finite number of times.

Any suitable bonus feature may be applicable. Thus, the bonus feature may include at least one of changes in definitions of symbol functions, for example, to scatters, substitutes, bonus symbols, feature triggers, etc, paytable variations or an increase in the number of free games awarded.

Preferably, the bonus feature for the initial series of free games is a paytable where all wins are doubled in comparison with the paytable applicable to a base game, the bonus feature for the subsequent series of free games is a paytable where all wins are trebled, the bonus feature for the further series of free games is a paytable where all wins are multiplied by five and the bonus feature for a fourth series is a paytable where wins are multiplied by ten. Any series of free games after the fourth series of free games has the bonus feature of the fourth series of free games applied to them. In other words, no further bonuses are awarded.

The invention may be applicable in respect of any types of base games played on a gaming machine. Thus, although the invention would be particularly applicable in respect of spinning reel-type base games, it could apply also in respect of card games, ball games such as Keno, or the like.

The trigger condition which triggers the subsequent and any further series of free games is the same as the trigger condition which triggered the initial series of free games. For example the trigger condition may be the appearance of three scatter symbols anywhere on the display means.

BRIEF DESCRIPTION OF THE DRAWINGS

The invention is now described by way of example with reference to the accompanying drawings in which.

DETAILED DESCRIPTION OF THE DRAWINGS

Figure 1:
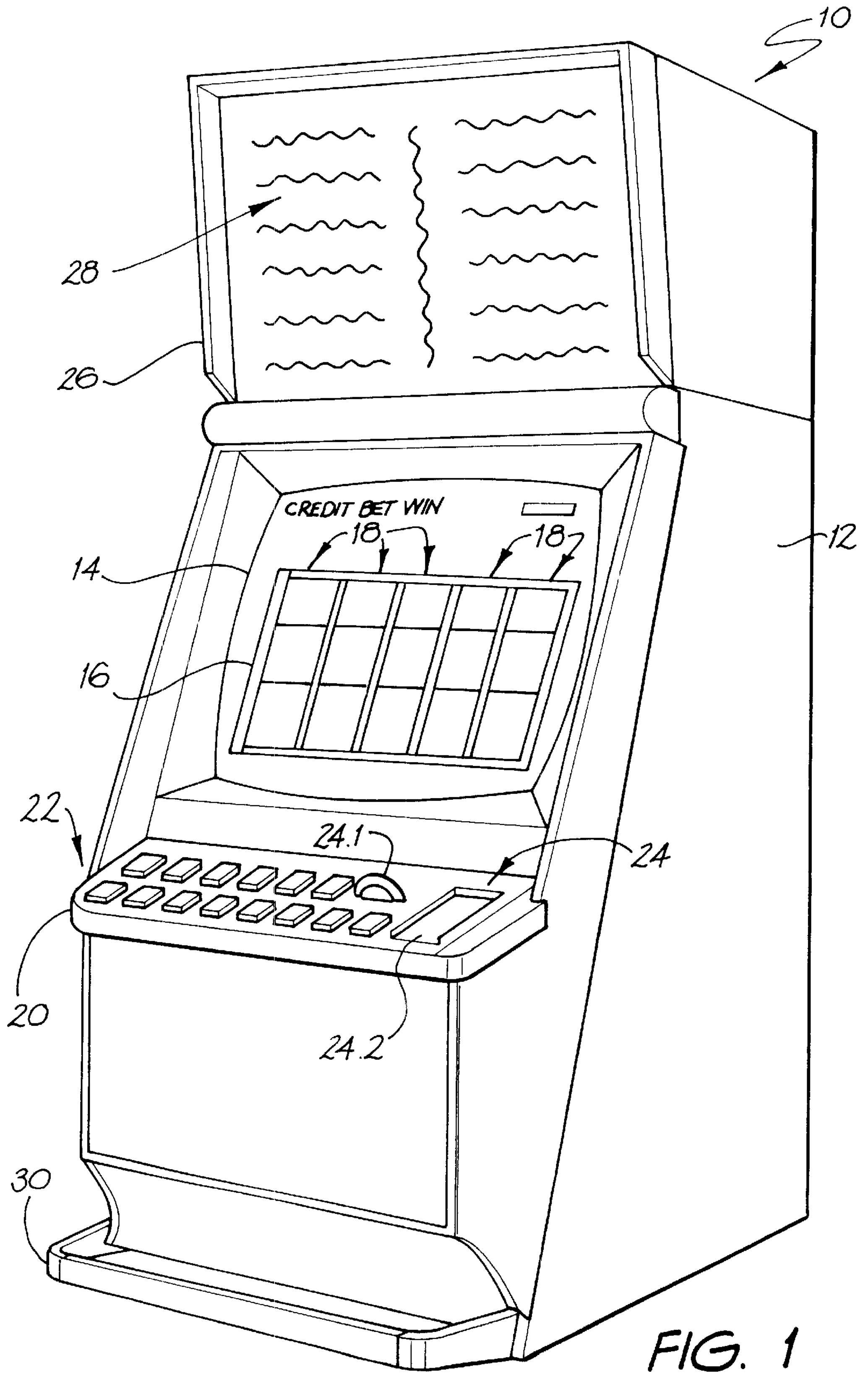
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
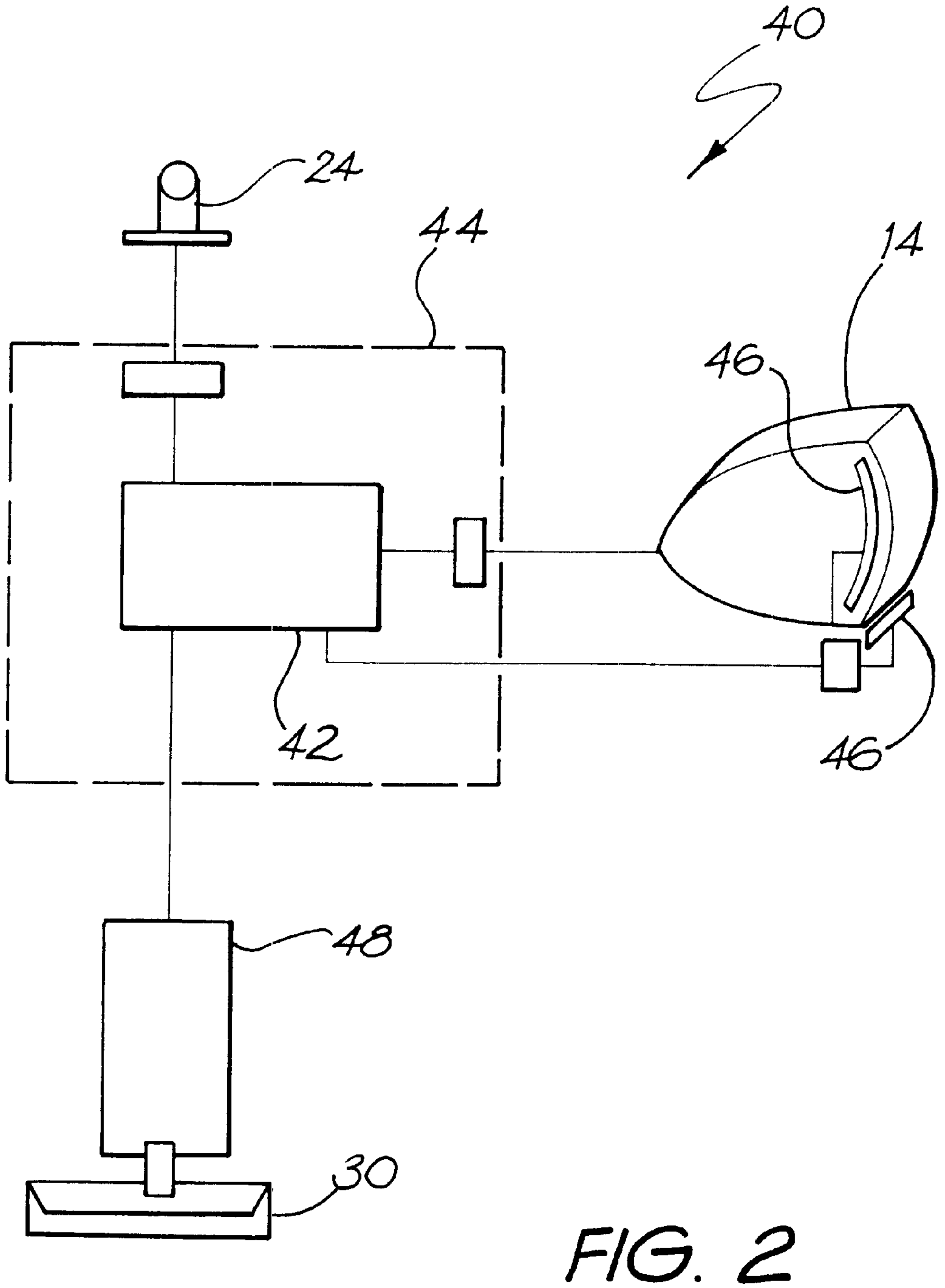
FIG. 2 shows a schematic block diagram of a control circuit of the gaming machine of FIG. 1.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 44 drives a payout mechanism 48 which, for example, may be a coin hopper for feeding coins to the coin tray 30 to make a pay out to a player when the player wishes to redeem his or her credit.

Figure 3:
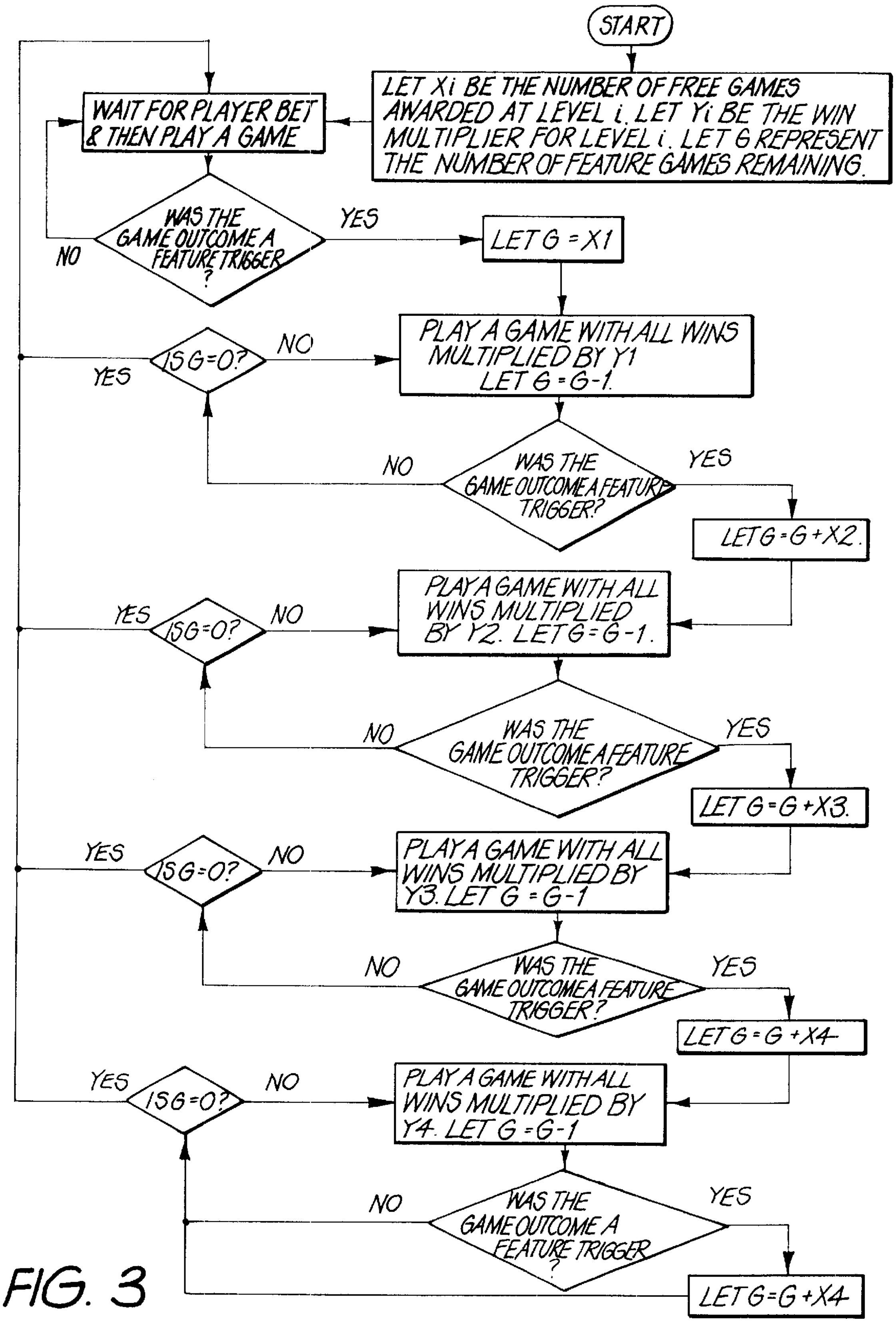
FIG. 3 shows a flow chart of a game played on the gaming machine.

Referring now to FIG. 3 of the drawings, a flow chart of a game played on the gaming machine in FIG. 1 is illustrated. When a base game is played on the machine 10 and a trigger condition arises an initial series of free games is awarded. For example, ten free games are awarded in the initial series of free games.

A paytable applicable to the free games of the initial series of free games has prizes which are double those of a paytable applicable in respect of the base game.

If, during any one of the free games of the initial series of free games, the same trigger condition arises, a subsequent series of free games is awarded. The subsequent series of free games is applicable immediately and has a different bonus feature associated with it. In the preferred embodiment of the invention, the bonus feature applicable is a paytable where the prizes are treble those of the paytable applicable to the base game.

However, the bonus feature applicable in respect of the subsequent series of free games is applicable not only to the free games associated with the subsequent series of free games but also to any free games remaining from the initial series of free games.

In other words, assuming the trigger condition again occurred in the sixth game of the initial series of ten free games, the triple award paytable applies to all ten free games of the subsequent series of free games as well as to the remaining four games of the initial series of free games.

If, in the subsequent series of free games or in any of the remaining free games of the initial series of free games, the trigger condition again occurs, a further series of free games is awarded with a further bonus feature being applicable. In the preferred embodiment, the bonus feature for the further series of free games is a paytable where all prizes awarded are five times those of the paytable applicable to the base game. Once again, the bonus feature for the further series of free games is applicable not only to the games of the further series of free games but also to any remaining games from the subsequent series of free games and any remaining games from the initial series of free games.

It will be appreciated that the number of times the trigger condition occurs where the bonus feature increases may take place a finite number of times. Thus, as shown in the flow chart, in the preferred embodiment, an increasing bonus feature is applicable in respect of the first four trigger conditions whereafter it is no longer increased.

Thus, should a trigger condition occur for a fourth time, yet a further series of free games is awarded with yet a further bonus feature being applicable. The yet further bonus feature applicable in respect of this fourth series of free games and any games remaining from earlier series of free games is a paytable where all prizes awarded are ten times those of the paytable applicable to the base game.

It will also be appreciated that the trigger frequency may decrease for at least some of the series of free games by changing the length or layout of the reel strips. This allows both the return to player percentage for different series of free games and/or the likelihood of getting a trigger condition to be adjusted as necessary or required.

Hence, it is an advantage of the invention that a gaming machine 10 is provided which includes a game which the applicant believes will enhance player interest.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A gaming machine having a display means and a game control means arranged to control images displayed on the display means, the game control means being arranged to play a game wherein random events are caused to be displayed on the display means and, if a predefined winning event results, the machine awards a prize, the gaming machine being characterised in that if the predefined result includes a trigger condition which results in an initial series of free games awarded to a player and, during the initial series of free games, another trigger condition arises, a subsequent series of free games, including a bonus feature, is awarded and implemented immediately during the existence of the initial series of free games with the bonus feature applicable to said subsequent series of free games being applied to the remaining games of the initial series of free games as well as to the games of the subsequent series of free games.

2. The gaming machine of claim 1 in which the game includes an initial bonus feature awarded during the initial series of free games.

3. The gaming machine of claim 2 in which, when the subsequent series of free games occurs, the bonus feature of the subsequent series of free games supersedes the initial bonus feature applicable in respect of the remainder of the games of the initial series so that the bonus feature applicable to the subsequent series of free games applies to all the remaining free games.

4. The gaming machine of claim 3 in which if, in the subsequent series of free games, the trigger condition again arises to trigger a further series of free games, the further series of free games has a further bonus feature associated with it.

5. The gaming machine of claim 4 in which the further bonus feature supersedes the bonus feature of the remaining games of the subsequent series of free games as well as any remaining games of the initial series of free games.

6. The gaming machine of claim 5 in which the awarding of yet further bonus features when additional free games are triggered occurs a finite number of times.

7. The gaming machine of claim 6 in which the bonus feature includes at least one of changes in definitions of symbol functions, paytable variations or an increase in the number of free games awarded.

8. The gaming machine of claim 7 in which the bonus feature for the initial series of free games is a paytable where all wins are doubled in comparison with the paytable applicable to a base game, the bonus feature for the subsequent series of free games is a paytable where all wins are trebled, the bonus feature for the further series of free games is a paytable where all wins are multiplied by five and the bonus feature for a fourth series is a paytable where wins are multiplied by ten.

9. The gaming machine of claim 8 in which, any series of free games after the fourth series of free games has the bonus feature of the fourth series of free games applied to them.

10. The gaming machine of claim 1 in which the trigger condition which triggers the subsequent and any further series of free games is the same as the trigger condition which triggered the initial series of free games.

* * * * *